United States Patent
Mohan et al.

(10) Patent No.: US 10,218,675 B2
(45) Date of Patent: Feb. 26, 2019

(54) LEGACY DEVICE SECURITIZATION USING BUMP-IN-THE-WIRE SECURITY DEVICES WITHIN A MICROGRID SYSTEM

(71) Applicant: Honeywell International Inc., Morristown, NJ (US)

(72) Inventors: Apurva Mohan, Maple Grove, MN (US); Himanshu Khurana, Plymouth, MN (US); Gregory Brainard, Rio Rancho, NM (US); Scott Fischer, Peoria, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/696,822

(22) Filed: Apr. 27, 2015

(65) Prior Publication Data
US 2015/0312216 A1    Oct. 29, 2015

Related U.S. Application Data

(60) Provisional application No. 61/985,434, filed on Apr. 28, 2014.

(51) Int. Cl.
*H04L 29/06* (2006.01)
*G05B 19/418* (2006.01)
*H02J 4/00* (2006.01)

(52) U.S. Cl.
CPC .... *H04L 63/0209* (2013.01); *G05B 19/41855* (2013.01); *H04L 63/0227* (2013.01); *H02J 4/00* (2013.01); *Y02P 90/185* (2015.11)

(58) Field of Classification Search
CPC ..... H04L 69/03; H04L 63/1433; H04L 63/08; G06F 1/26; H02J 4/00

USPC .......................................................... 726/11
See application file for complete search history.

(56) References Cited

U.S. PATENT DOCUMENTS

| 9,515,491 | B2* | 12/2016 | Bhageria | H02J 4/00 |
| 2003/0233573 | A1* | 12/2003 | Phinney | G06F 21/606 |
| | | | | 726/14 |
| 2009/0299542 | A1* | 12/2009 | Nuqui | H04L 63/1441 |
| | | | | 700/297 |

(Continued)

FOREIGN PATENT DOCUMENTS

EP      1278333 A1    1/2003

OTHER PUBLICATIONS

Teklemariam Tsegay Tesfay et al: "Cyber-Secure Communication Architecture for Active Power Distribution Networks", Applied Computing, Mar. 24, 2014, pp. 545-552.

(Continued)

*Primary Examiner* — Eleni A Shiferaw
*Assistant Examiner* — Bryan F Wright
(74) *Attorney, Agent, or Firm* — Brooks, Cameron & Huebsch, PLLC (57) ABSTRACT

Devices, methods, systems, and computer-readable media for legacy device securitization within a microgrid system are described herein. One or more embodiments include a system having a microgrid network with at least one remote network connection to a non-local network device and the network having at least one local legacy device in communication with the non-local network device and a bump-in-the-wire (BITW) security device between the local legacy device and the at least one remote connection.

17 Claims, 3 Drawing Sheets

(56) References Cited

U.S. PATENT DOCUMENTS

| | | | | |
|---|---|---|---|---|
| 2010/0042689 | A1* | 2/2010 | Doggett | H04L 63/0218 709/206 |
| 2011/0082596 | A1* | 4/2011 | Meagher | H02J 13/001 700/291 |
| 2012/0101639 | A1* | 4/2012 | Carralero | G06F 1/26 700/286 |
| 2013/0015703 | A1* | 1/2013 | Rouse | H02J 3/38 307/18 |
| 2013/0036311 | A1* | 2/2013 | Akyol | H04L 63/08 713/189 |
| 2013/0086635 | A1* | 4/2013 | Hershey | H04L 63/1408 726/3 |
| 2013/0198847 | A1* | 8/2013 | Sampigethaya | H04L 63/1433 726/25 |
| 2013/0307335 | A1* | 11/2013 | May | H02J 4/00 307/31 |
| 2013/0346768 | A1* | 12/2013 | Forbes, Jr. | G06F 1/266 713/310 |
| 2015/0097697 | A1* | 4/2015 | Laval | H04L 69/03 340/870.02 |
| 2016/0043549 | A1* | 2/2016 | Beauregard | G05B 13/04 700/286 |
| 2017/0063918 | A1* | 3/2017 | Mohan | G05B 19/41855 |

OTHER PUBLICATIONS

Laaksonen, et al., "Synchronized Re-Connection of Island Operated LV Microgrid Back to Utility Grid", 2010 IEEE PES, Oct. 11, 2010, 8 pp.

Pignolet, et al., "Future internet for smart distribution systems", 2012 3rd IEEE PES, Oct. 14, 2012, 8 pp.

Keromytis, et al. "Transparent Network Security Policy Enforcement", USENIX, Feb. 7, 2002, 12 pp.

Weerathunga, et al., "Implementation of IPSec in substation gateways", 2012 IEEE 6th International Conference, Sep. 27, 2012, pp. 327-331.

Extended Search Report from related European Patent Application 15165414 dated Nov. 12, 2015, 10 pp.

* cited by examiner

LEGACY DEVICE SECURITIZATION USING BUMP-IN-THE-WIRE SECURITY DEVICES WITHIN A MICROGRID SYSTEM

TECHNICAL FIELD

The present disclosure relates to methods, devices, systems, and computer-readable media for legacy device securitization within a microgrid system.

BACKGROUND

Microgrids enable aggregation of various types of generating and non-generating sources as a unified control unit. Microgrid control networks are connected to various external networks for a variety of reasons, for example Supervisory Control and Data Acquisition (SCADA) networks for demand-response applications and enterprise networks or the Internet for remote monitoring and control.

These external connections expose the microgrid to threats from remote adversaries, especially cyber attackers. This becomes especially concerning for installations in sensitive sites like military bases, where military missions depend on critical infrastructure, like microgrids, for their success.

To address these issues, the present disclosure presents a cyber-security architecture that is based on a unique cyber-security strategy that, in some embodiments, can be achieved by hardware devices that provide strong cryptographic separation. Such a concept can provide a secure network of assured power enclaves (also called SNAPE) in some embodiments.

DETAILED DESCRIPTION

Microgrids are a collection of distributed energy resources (DERs), storage, and loads under common coordination and control to provide a single functional interface to enable its management as a single unit. A microgrid can be defined as a group of interconnected loads and distributed energy resources within clearly defined electrical boundaries that acts as a single controllable entity with respect to the grid. A microgrid can connect and disconnect from a larger grid structure (the grid or main grid) to enable it to operate in both grid-connected or island-mode (separated from the grid).

As such, microgrids can act as a single point of integration for generating (renewable and/or non-renewable) and non-generating sources. Microgrids accumulate all the generation capacity at a site and providers power to the local site not only in cases of blackouts but also in ancillary capacity to lower energy usage from the main grid.

Microgrids are deployed in various types of organizations like military bases, hospitals, universities, residential communities, and government buildings for energy efficiency and security. Microgrids offer various types of deployments like a single microgrid providing power to a site, multiple microgrids functioning in isolation at a site, or multiple microgrids deployed as power enclaves where each enclave is served by a single microgrid unit but all these units are connected via electrical power lines for load balancing and communication lines for common control and coordination.

In industrial control systems, operations sites are often distributed and multiple sites are connected with a common control center. Also, the control center needs to communicate with the enterprise network. To enable all the communications, microgrids and/or control centers are often connected to the Internet either directly or via a control center used to control the microgrid.

Typically, the control center to microgrid communications use Distributed Controls System (DCS) protocols like DNP3, ModBus, etc. or, for longer distances, IP based protocols or other suitable communication types can be used, for example. These include DCS IP protocols or TCP/IP protocol.

With connection to the Internet, the microgrids are exposed to various cyber threats. Cyber attackers could potentially target a microgrid and attempt to disrupt site operations by launching cyber-attacks. Targeting microgrids would become more lucrative to attackers if they are installed on sensitive sites like military bases, hospitals, or sensitive government buildings.

In the present disclosure, a cyber-security architecture is proposed that maintains network separation in microgrid communications to reduce the attack surface while improving the communications and security efficiency. The deployment architecture could be utilized by a military base where multiple power enclaves with secure communications can be envisioned.

As such, a microgrid system deployed based on the architecture described in the embodiments of the present disclosure could provide energy security and/or efficiency to the military base, thereby contributing to the energy security and/or net-zero goals of the government, for example. The architecture embodiments discussed herein can use cryptographic mechanisms to enforce strong separation between the networks and also provide strong cyber-security. Details of the proposed architecture embodiments are presented below.

Additionally, embodiments of the present disclosure can provide the following benefits:
1) Develop a practical deployment architecture for microgrids for security and scalability.
2) Reduce the certification burden and/or time for microgrid deployment by, for example, using DIACAP certified hardware devices for cryptographic network separation.

In the current DCS or SCADA environment, typically the International Electrotechnical Commission's (IEC)—IEC 61850 architecture for electric power systems is used for communications between power sub-stations. It can also be used for connecting power enclaves defined in the architecture embodiments of the present disclosure where multiple microgrids coordinate command and control.

As presented above, as microgrid systems are being connected to external networks like enterprise networks and the Internet, the threat to these systems increases, significantly. Cyber attackers can attack microgrid power enclaves and compromise critical operations, for example, by exploiting vulnerabilities at the network, system, and/or applications level.

Also, some microgrid deployments are planned with network and IT security that are not standards compliant.

Many systems rely on perimeter protection while the internal systems were designed with lower security, intended to be part of a closed network. As such, achieving defense-in-depth in these microgrid systems or networks can be challenging.

Another related problem in power networks is that communication protocols like IEC 61850 were not designed for security and they do not support security features, inherently. As such, providing communications security using these protocols may require a lot of ad-hoc and ancillary security mechanisms.

These ad-hoc and ancillary security mechanisms can inadvertently introduce security vulnerabilities in the system, which cyber attackers can exploit. Standards like IEC 62351 aim to secure IEC 61850 based communications, but even IEC 62351 does not cover the entire gamut of security vulnerabilities in networked microgrid deployments.

Object Linking and Embedding (OLE) for Process Control Unified Architecture (OPC UA) presents a framework that provides a standards-based communication backbone with inbuilt security that covers a larger set of cyber-security threats but it still does not address microgrid specific threats like exposure of sensitive control networks, integration of legacy components, and complexities in achieving cyber-security certifications. These issues will be elaborated upon in detail later in this disclosure.

The present section of the disclosure is focused on the three problems that are discussed above. First, many legacy microgrid devices in the network cannot perform security operations like encryption, message signing, message hashing, or other cryptographic operations.

As such, it becomes difficult to enforce uniform and strong security policy in the system. If the security policy is chosen for varying levels of security based on the device capabilities, then attackers can compromise lower end devices with lower security and then propagate the attack to other networked devices that may have higher security when approached directly, but may allow indirect access via these less secure devices.

Second, for microgrid installations on defense networks the deployment should achieve U.S. Department of Defense Information Assurance Certification and Accreditation Process (DIACAP) (or more recently DIARMF) certification. Since the deployment network includes several sub-networks, the task of security assessment and certification for the microgrid control networks can become very complex and challenging.

In the following portion of the detailed description, reference is made to the accompanying figures that form a part hereof. The figures show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense. Also, as used herein, "a" or "a number of" something can refer to one or more such things. For example, "a number of operations" can refer to one or more operations.

The architecture embodiments of the present disclosure enable secure communications and control among multiple microgrid systems at a site, where each of the microgrids creates a power enclave.

Figure 1:
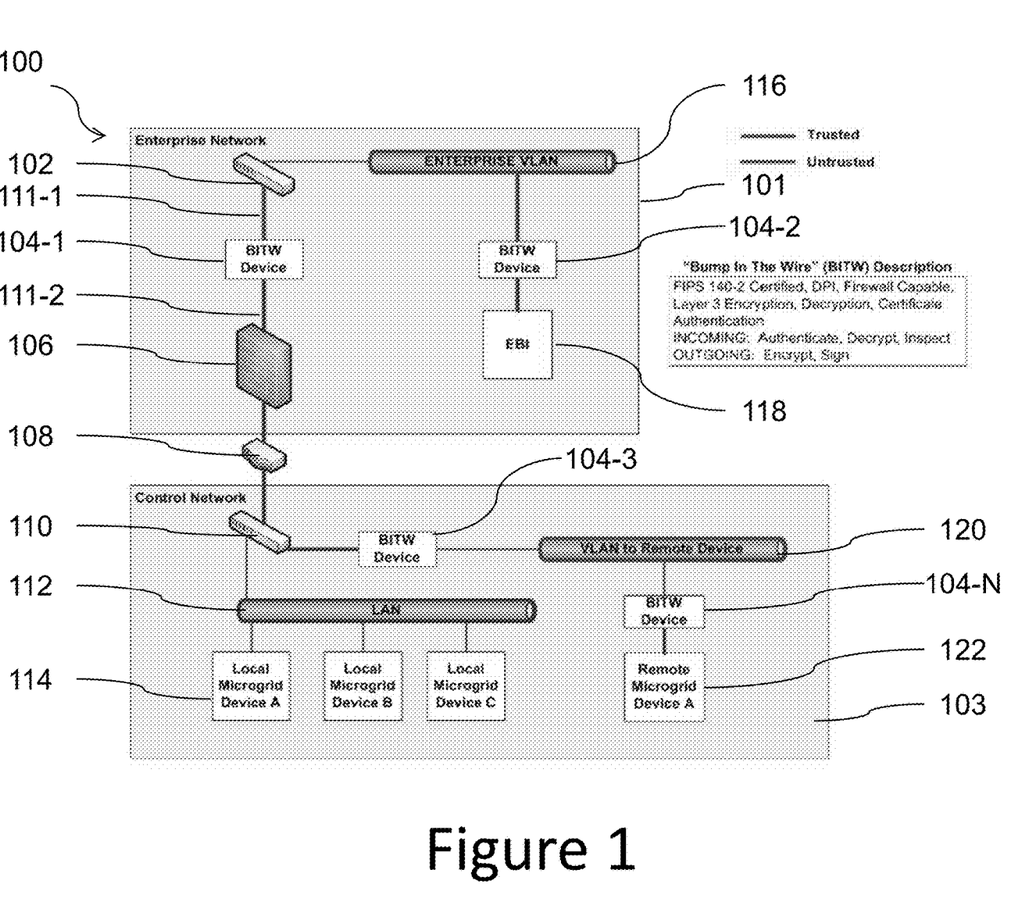
FIG. 1 illustrates an example of a system for legacy device securitization used with a microgrid according to one or more embodiments of the present disclosure.

FIG. 1 illustrates an example of a system for legacy device securitization used with a microgrid according to one or more embodiments of the present disclosure. FIG. 1 presents an embodiment of an architecture from the communication, network, and system security point of view. It shows external communications of a system 100 with an enterprise network 101 and a local network 103 that connects to the microgrid.

In the embodiment of FIG. 1, a system 100 includes a number of devices connected to several networks to provide control, monitoring, and access rights provisioning, among others possible functions. For example, in the illustrated embodiment, an enterprise network 101 includes a gateway 108 that provides connectivity to remote networks, a firewall 106 to provide some securitization of the enterprise network, a router 102 that connects to an enterprise virtual local area network (VLAN) 116 and a non-legacy device 118 (an enterprise building integrator (EBI) for providing energy management).

Additionally, the network 101 includes two "Bump-In-The-Wire" (BITW) security devices 104-1 and 104-2. These devices are positioned within the system to insulate the other devices (e.g., in this example, the EBI and the devices of the control network 103) from access by an unwanted party via the enterprise VLAN 116 by providing a higher level of security and/or more up to date security than can be implemented on the legacy devices of the system. In some embodiments, these BITW security devices (e.g., 104-1, 104-2) can be in communication with each other via a separate network. In the example illustrated in FIG. 1, one BITW device is located between the firewall 106 and the router 102, while the other BITW is located between the EBI 118 and the enterprise VLAN 116.

In the embodiment illustrated in FIG. 1, the enterprise network 101 is connected to the control network 103 via the gateway 108, thereby allowing the devices of network 101 and network 103 to communicate with each other. The control network 103 provides control functionality to the microgrid and includes a gateway/router 110 providing the functionalities of the devices 102 and 108 above for network 103.

The network 103 also includes a local area network (LAN) 112 that allows for local microgrid devices 114 to communicate with each other and this LAN is connected to the gateway/router 110 to allow remote contact with these devices via other networks. Remote contact can, for example, come from the enterprise network 101 or via the VLAN 120 that connects the control network to one or more remote microgrid devices 122. Accordingly, BITW devices can be positioned to secure the devices of the system from these remote contacts.

For example, as shown in the embodiment illustrated in FIG. 1, the control network 103 can include a BITW security device 104-3 between the gateway/router 110 and the VLAN 120 that allows contact with the remote microgrid device 122. In some embodiments, as shown in FIG. 1, a BITW 104-N can be positioned between the remote microgrid device 122 and the VLAN 120 to provide security to that device.

A "Bump-In-The-Wire" (BITW) security device (e.g., devices 104-1, 104-2, 104-3, 104-N) as used herein is a device that is used to provide securitization of legacy equipment and/or microgrid devices that have low or no security functionality (e.g., cannot perform cryptographic operations into secure communications networks).

These BITW devices can, for example, have the ability to encrypt communications using various standard protocols to provide secure communications to the network. They also provide cryptographic isolation between the networks, so that the isolation does not depend on a physical network which is hard to track on complex networks.

In the architecture illustrated in FIG. 1, OPC UA can, for example, be utilized for implementing the communication backbone between one or more of the BITW security devices of the system. OPC UA is backward compatible with DCS protocols like IEC 61850, which are used for messaging, so its usage may be beneficial.

OPC UA provides authentication and authorization services at the application layer. Details of these services are provided herein.

Availability in the network can be provided by multiple separate mechanisms. For example, isolation of the control network from external networks ensures that the control network communication can meet low latency requirements and/or critical infrastructure components are not unavailable due to large latencies or disruptions caused by microgrid components being out of sync. Further, cryptographic protection of messages and network, as well as network firewalls can be used to ensure that attackers cannot compromise the network or launch Denial of Service (DoS) attacks against the network's components.

Finally, important events like access attempts, successful logins, and/or messages can be logged into the microgrid systems to enable auditing and forensic analysis. This, for example, helps in identifying anomalous behavior and/or also to perform root cause analysis, if an attack on the system is suspected. This can be accomplished by a computing device such as that illustrated in FIG. 3, as will be described in more detail below.

The OPC UA integration with the architecture embodiments of the present disclosure to provide a secure communication backbone to the system is described below. Herein the disclosure presents the OPC UA security model and some of its details to illustrate how the architecture embodiments can provide some of the security properties described above.

Figure 2:
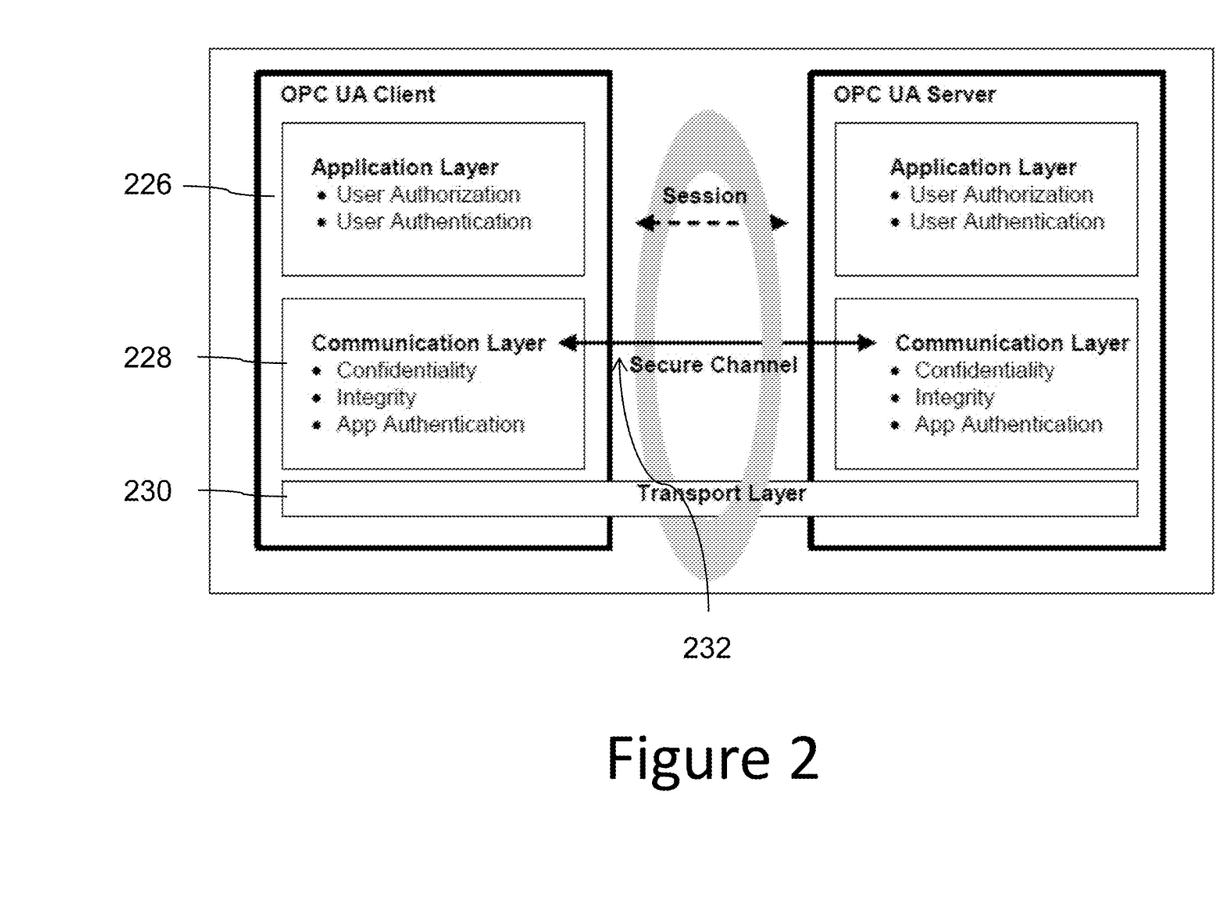
FIG. 2 illustrates an example of how the functionalities of the system can be divided onto different layers according to one or more embodiments of the present disclosure.

FIG. 2 illustrates an example of how the functionalities of the system can be divided onto different layers according to one or more embodiments of the present disclosure. OPC UA is a standard that is published by the OPC foundation. It is an improvement of the previous standard called OPC classic.

OPC UA builds upon OPC classic with several significant updates including an open platform architecture, built-in security model, and feature-rich data modeling. It is also backward compatible with standards like IEC-61850.

This makes OPC UA a suitable choice for integrating with the architecture embodiments of the present disclosure. The OPC UA security model is shown in FIG. 2.

The model has three layers, the communication layer 228, the application layer 226, and the transport layer 230. In the communication layer 228, a secure channel 232 is established for providing confidentiality and integrity to the communications between a client (e.g., microgrid device) and a server (e.g., BITW).

Another feature that is supported is application authentication to allow only an authenticated application to participate in microgrid operations. In the application layer, user authentication and authorization can be provided to establish a secure session over a secure channel.

One point to note here is that availability itself is not provided by the OPC UA security model. It relies on minimum processing of messages prior to authentication and defers availability property to server implementation. The architecture embodiments of the present disclosure complement these by providing strong availability properties by features like network segmentation, cryptographic separation, and network firewalls, in various embodiments.

OPC UA security model is comprehensive and offers multiple options for achieving the security properties in the communication and application layers. In the application layer, authentication can be achieved by several different means (e.g., username/password, an X.509v3 certificate, or a WS-SecurityToken). An International Telecommunication Union—X.509v3 certificate involves multiple asymmetric cryptographic operations that are computation intensive and may not be the most suitable for each authentication, for example, on resource constrained environments, but may be suitable in some applications.

Username/passwords and WS security tokens are examples of technologies that can provide comparatively efficient authentication in the microgrid system. During system implementation, a comparison could be made between the different mechanisms with the real time requirements of the system and a selection of the most efficient form of authentication for the architecture embodiments of the present disclosure could be made.

Authorization in the OPC UA security model is more open ended and can integrate already deployed authorization solutions. Since the architecture embodiments of the present disclosure are targeting microgrids, existing authorization mechanisms in the form of Access Control Lists (ACLs) can be integrated. This would provide fine grained authorization on microgrid system resources using existing mechanisms, in some embodiments.

In the communication layer, confidentiality can be provided by encryption in the secure channel, message signatures for message integrity, and/or digital signatures for application authentication. Like the application layer, the OPC UA stack provides multiple options to implement each security mechanism.

In various embodiments, the optimal combination of asymmetric and symmetric cryptographic algorithms in the architecture embodiments of the present disclosure can be selected to meet the performance requirements of the system. OPC UA is flexible and allows deployments to select any combination of these mechanisms to suit specific deployment environments.

To illustrate, a combination of mechanisms like Transport Layer Security (TLS) for channel protection and symmetric algorithms for message integrity will suit the microgrid deployment environment. This would allow embodiments of the present disclosure to leverage the benefit of TLS for channel protection and the advantage of symmetric algorithms like AES256 and HMAC (SHA1) for improved real time performance for message integrity protection. Provided in the next section is a short description of a computing device that could be used as a BITW security device in the embodiments of the present disclosure.

Figure 3:
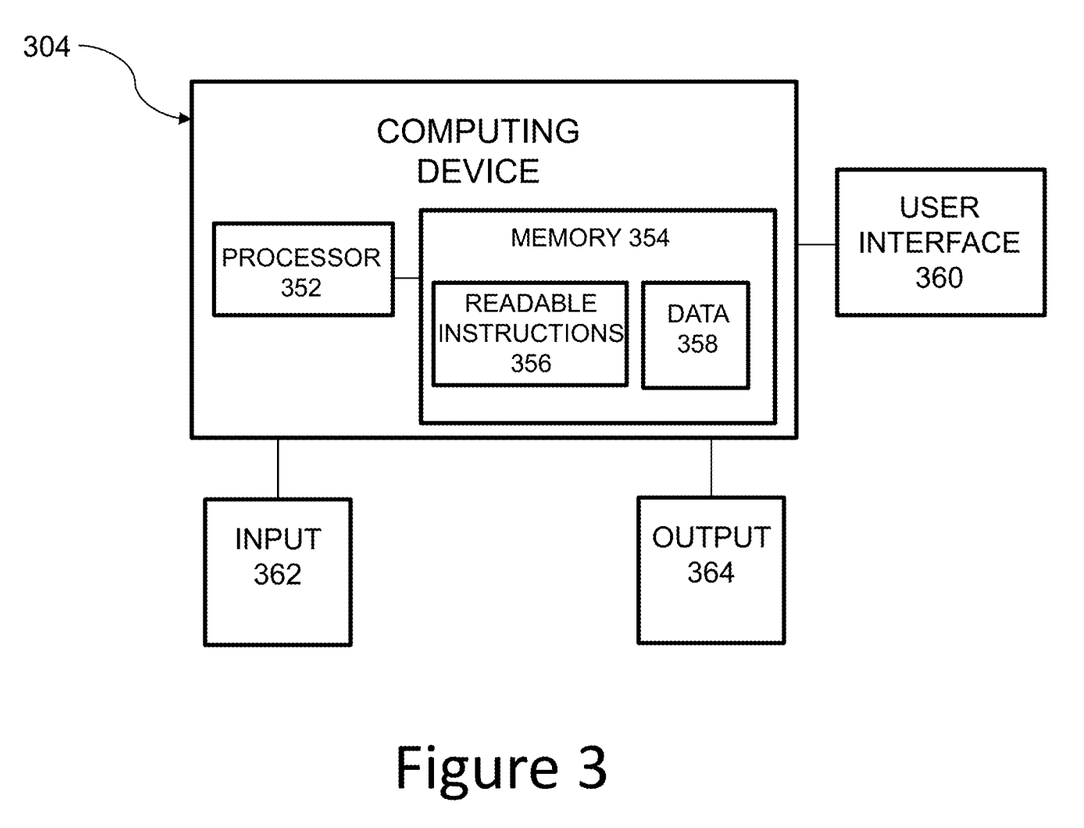
FIG. 3 illustrates an example of a computing device that can be utilized in the system according to one or more embodiments of the present disclosure.

FIG. 3 illustrates a computing device that can be utilized according to one or more embodiments of the present disclosure. For instance, a computing device 304 can have a number of components coupled thereto. The computing device 304 can include a processor 352 and a memory 354. The memory 354 can have various types of information including data 358 and executable instructions 356, as discussed herein.

The processor 352 can execute instructions 356 that are stored on an internal or external non-transitory computer device readable medium (CRM). A non-transitory CRM, as used herein, can include volatile and/or non-volatile memory. Volatile memory can include memory that depends upon power to store information, such as various types of dynamic random access memory (DRAM), among others. Non-volatile memory can include memory that does not depend upon power to store information.

Memory 354 and/or the processor 352 may be located on the computing device 304 or off of the computing device 304, in some embodiments. As such, as illustrated in the embodiment of FIG. 3, the computing device 304 can include a network interface having input and/or output capabilities (e.g., input 362 and output 364 connections). Such an interface can allow for processing on another networked computing device and/or can be used to obtain data and/or executable instructions for use with various embodiments provided herein.

As illustrated in the embodiment of FIG. 3, the computing device 304 can include a user interface 360 that allows a user to review instructions and/or data on the device 304. Such an interface can be used to review access privileges to be given to a device, review instructions to be sent to a device, and/or data available on the device 304 or provided by another device, among other functions.

In the section below, the discussion will identify different potential cyber threats that exist in the microgrid deployment scenario as illustrated in FIGS. 1 and 2 and analyze how the architecture embodiments of the present disclosure can be utilized to mitigate those cyber threats.

Remote Sabotage:

Threat: An adversary can remotely access the microgrid and launch elevation of privilege to gain privileged rights on the microgrid system. It can then perform unauthorized operations to sabotage microgrid operations to disrupt critical infrastructure functionality.

Mitigation: embodiments of the present disclosure can implement a number of security controls to mitigate this threat. Network communication is secure which prevents from threats like session hijacking. Identity management with strong account management can be implemented to prevent account spoofing attacks; and embodiments of the present disclosure can implement access control on the microgrid system to prevent unauthorized access to resources and operations in the microgrids.

Tampering with Power Enclave Synchronization:

Threat: The adversary can try to disrupt the synchronization among the power enclaves by reporting wrong power measurements to other entities. This could potentially destabilize the power enclaves and disrupt their operations.

Mitigation: Authentication and access control protections on the microgrids prevent unauthorized access. As such, the case that an adversary could reach the control network and disrupt its operations is highly unlikely.

Sensitive Information Disclosure:

Threat: An attacker can view sensitive information in the microgrid system which is either at rest on the system or is in transit during its exchange in the system.

Mitigation: The architecture embodiments of the present disclosure implement authentication and access control on the microgrid systems, so that only authorized entities in the system can view sensitive data. Additionally, information during transit is protected by using strong network security by encrypting the communication channels using TLS. These controls protect sensitive information at rest or in transit from unauthorized disclosure.

Targeting Legacy Devices:

Threat: Legacy devices in the microgrid system are not able to perform network encryption to create secure communication channels. Attackers can attack these channels to view sensitive information or to manipulate commands on the network.

Mitigation: Architecture embodiments of the present disclosure use a novel concept called "Bump-In-The-Wire" (BITW) where a hardware device is added to the network in front of legacy devices which are not able to provide network security. The BITW device provides network security via TLS and hence makes the legacy device compatible with the other devices to provide uniform and strong network security. The BITW devices can be DIACAP3 certified so that they provide strong and standards compliant network security irrespective of the end device capability.

Malware Installation:

Threat: An attacker can install malware on the microgrid devices by various attacks like modifying the device firmware, or installing malware on the system.

Mitigation: Embodiments of the present disclosure can provide multiple types of protection against this type of attack. For example, installing software or firmware on the device is a privileged action that only an administrator can perform. This would require an attacker to compromise the highly secure administrator accounts.

In another example, integrity checks on the firmware or software are performed by validating the digital signatures on the firmware or software. Only firmware or software that passes the validity check is allowed to be installed on the microgrid system. These mechanisms protect against installing malware on the microgrid.

The section below, discusses some architectural tradeoffs in the context of the architecture embodiments of the present disclosure. Whenever security considerations are included in architectures, there are inevitably some tradeoffs that the architecture designer has to make to balance security versus performance, cost, development time, and/or usability. Since the architecture embodiments of the present disclosure can be designed for sensitive microgrid installations, this discussion is presented in that context.

In embodiments of the present disclosure, use of BITW devices is proposed for secure integration of legacy devices. This provides uniform security in the deployment network by enabling legacy devices to communicate using strong encryption algorithms.

Another related tradeoff in embodiments of the present disclosure is that by performing logical network separation using BITW devices, the complexity and latency on the network could increase. However, logical separation offers the choice of cryptographic algorithms for network protection.

Embodiments of the present disclosure propose use of TLS in the network for strong network protection. It also provides end device authentication and can be especially useful for sensitive installations. It also helps in achieving compliance with frameworks like DIACAP or DIARMF.

One downside of using TLS is that Public Key Infrastructure (PKI) certificates are to be installed and managed on the network. Using symmetric encryption is possible with TLS but that may be a non-standard mode of operation not preferred for regular deployments, in some applications.

Another tradeoff can be related to integrating OPC UA into an embodiment of the present disclosure. Integration of OPC UA can increase complexity and/or cost of system development. On the positive side, it can increase communication security by using standards based security. It also can provide a versatile and feature rich communication backbone for embodiments of the present disclosure.

One prior concept for microgrid cyber-security is presented based on a distributed control approach that uses IPv6 protocol for communications. Use of IPv6 can provide some benefits like making host scanning harder and/or identification from outside the network because of large number of possible IP addresses, end-to-end encryption, and more secure name resolution that can help in countering attacks like Address Resolution Protocol (ARP) poisoning.

In embodiments of the present disclosure, architectural risk analysis can be performed using threat modeling and included security controls and mechanisms to address them and provide higher security. Embodiments of the present disclosure can be designed to provide all the above mentioned benefits that are provided by an IPv6 based network.

The deployment of the IPv6 technique is on a private network with strong perimeter protection. The secure firewalls disable network scanning and identification. In the embodiments of the present disclosure end-to-end encryption can be provided, for example, using TLS.

Additionally, embodiments of the present disclosure can use BITW devices to provide end-to-end authentication on legacy devices. Architecture embodiments of the present disclosure can use TLS for network level authentication that can be configured for client and server mutual authentication. This can remove the possibility of an ARP attack on the system.

First, decentralized peer-to-peer control architectures in the IPv6 technique would mean that each of the nodes is equally trusted and can even take over the functionality of other nodes which is typically supported for automatic recovery. In addition to adding complexity in the system this approach potentially opens new attack vectors in the system. The adversary can now compromise any one node and try to sabotage the system.

In centralized model of the IPv6 technique, the server has much higher security than the client nodes. Maintaining trust in open decentralized peer-to-peer models is a hard problem and even controlled system deployments would inherit some of its threats if they are connected to the Internet.

Further, since the control and coordination is distributed to every node, it is not possible to segment the network and isolate them for higher security and performance; which is a functionality that is inherently supported and demonstrated in the embodiments of the present disclosure.

Also, the architecture proposed in the prior approaches assumes that all controller devices are newly deployed with the peer-to-peer capability inbuilt and there are no legacy devices. As such, it is unable to integrate legacy devices in its architecture.

On the other hand, embodiments of the present disclosure have a method to integrate legacy devices in the system, since most of the network deployments may be incremental and have to integrate legacy devices in their deployments.

Additionally, deploying IPv6 based networks can potentially open a number of security holes in deployments. If IPv6 and IPv4 are being run simultaneously, then IPv6 should be either tunneled over IPv4 or run independently.

In tunneling mode, configuration issues can create security holes in the system. If both the protocols are run in parallel, firewalls have to be configured to filter IPv6 traffic, which is not very common.

Normal firewalls can leave IPv6 traffic unfiltered, which can let the adversary use that as an insecure channel to enter the system. Also, IT administrators must learn new ways to deploy, configure, and monitor networks.

Some other issues in deployments using prior techniques include network trouble shooting, configuring firewalls, monitoring security logs, and secure configurations. Further, security operations center analysts must learn and apply new features for real time analysis, and network audit must be adapted to new security features. Most of the IPS/IDS tools do not effectively analyze and identify security vulnerabilities and attacks in IPv6 traffic leaving attack detection harder.

Provided below are some example embodiments of the present disclosure. For instance, in one embodiment, the system for legacy device securitization within a microgrid includes a microgrid network having at least one remote network connection to a non-local network device and the network having at least one local legacy device in communication with the non-local network device and a bump-in-the-wire (BITW) security device between the local legacy device and the at least one remote connection.

In some embodiments, the microgrid network includes a gateway device that provides the at least one remote connection. The microgrid network can include a firewall established between the gateway device and the BITW security device.

The microgrid network further includes a local area network between the BITW security device and the local legacy device. In some embodiments, the local area network can have low or no security for the network. (e.g., this may have been an island type network at one time where security software was not necessary as the network was not accessible by outside parties, but the network is now connected to another network that does allow access by outside parties and therefore the local area network is now vulnerable). The microgrid network includes a second BITW security device between the local legacy device and the local area network.

In various embodiments, the BITW security devices can communicate with each other on a secured network that is separate from the local area network and the network accessed by the remote network connection. This can be advantageous for cross checking security settings, verifying access requests, for software updates, and other beneficial functions.

In some embodiments, the level of security on the secured network can be more restrictive than at least one of the local area network and the network accessed by the remote network connection. This can be beneficial in restricting some portions of the network more than others, such as critical functions or devices of the network where very few users should have access.

In another example embodiment, a system for legacy device securitization used with a microgrid includes a first microgrid local network having at least two local devices, wherein at least one of the at least two local devices is a legacy device, and at least one remote network connection to a non-local network control device, and a bump-in-the-wire (BITW) security device between one of the at least one local legacy devices and the at least one remote connection to the non-local network control device.

The system can further include, a second microgrid local network having at least two local devices and at least one remote network connection to the first microgrid network, and a bump-in-the-wire (BITW) security device between at least one of the local devices and the at least one remote connection of the second microgrid local network.

In some embodiments, the BITW security devices of the first and second microgrid local networks communicate with each other on a secured network that is separate from the first and second local microgrid networks and the network accessed by the remote network connection. The microgrid network cab include a second BITW security device between the local legacy device and another network device on the microgrid local network.

The BITW security devices can communicate with each other on a secured network that is separate from the network accessed by the remote network connection.

In some embodiments, the communications on the secured network are used to grant access to a particular local device by another local device via the microgrid local network or a remote device via the remote network connection.

The communications on the microgrid local network and via the remote connection are control and monitoring communications for controlling or monitoring a microgrid associated with the microgrid local network.

The embodiments of the present disclosure provide architecture embodiments for secure deployment of microgrids. Microgrids can be part of critical infrastructure for energy and are being deployed on military bases and elsewhere, for example, as a means to reduce dependency on the power grid, to account for power security during outages, and/or to achieve the net-zero goals. This disclosure presents the various cyber-security threats that could potentially impact these microgrids as they are connected to external networks including the Internet and solutions to those threats.

The disclosure presents security problems that are inherited by connection to vulnerable SCADA networks, integration of legacy devices with limited capability to perform security operations, and how to get certification for these microgrid networks for operations, for example, on military bases.

To address these issues the present disclosure describes various embodiments, which can provide a cyber-security architecture for secure deployment of microgrids. The architecture embodiments of the present disclosure introduce several unique concepts like logical separation of the microgrid control network from the SCADA network, BITW devices for integrating the legacy devices securely, and standards based security controls for microgrid network protection.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for legacy device securitization within a microgrid, comprising:

a microgrid network having at least one remote network connection to a non-local network device and the microgrid network having at least one local legacy device in communication with the non-local network device, wherein the at least one local legacy device cannot perform cryptographic operations;

a first bump-in-the-wire (BITW) security device between the at least one local legacy device and the at least one remote connection, wherein the first bump-in-the-wire (BITW) security device performs asymmetric and symmetric operations on data passed between the at least one local legacy device and the non-local network device, wherein the first bump-in-the-wire (BITW) security device includes a first user interface to allow a user to access privileges to be given to the first bump-in-the-wire (BITW) security device, instructions to be sent to the first bump-in-the-wire (BITW) security device, and data available on the first bump-in-the-wire (BITW) security device to restrict access to the microgrid network, wherein the privileges to be given to the first bump-in-the-wire (BITW) security device include installing software and firmware on one or more devices of the microgrid network, wherein access attempts, successful logins, messages, or a combination thereof are logged into the microgrid network to enable auditing and forensic analysis, and wherein one or more authentication technologies are compared and selected for the microgrid network based on real time requirements of the microgrid network; and a second bump-in-the-wire (BITW) security device between the non-local network device and the at least one remote connection, wherein the second bump-in-the-wire (BITW) security device performs asymmetric and symmetric operations on data passed between the non-local network device and the at least one remote connection, wherein the first and second bump-in-the-wire (BITW) security devices are positioned within the microgrid network to secure the at least one local legacy device, and wherein the bump-in-the-wire (BITW) security devices communicate with each other to cross check security settings and verify access requests on a secured network that is separate from the network accessed by the remote network connection, wherein the second bump-in-the-wire (BITW) security device includes a second user interface to allow the user to access privileges to be given to the second bump-in-the-wire (BITW) security device, instructions to be sent to the second bump-in-the-wire (BITW) security device, and data available on the second bump-in-the-wire (BITW) security device to restrict access to the microgrid network, and wherein the privileges to be given to the second bump-in-the-wire (BITW) security device include installing the software and the firmware on the one or more devices of the microgrid network.

2. The system of claim 1, wherein the microgrid network includes a gateway device that provides the at least one remote connection.

3. The system of claim 2, wherein the microgrid network includes a firewall established between the gateway device and the BITW security device.

4. The system of claim 3, wherein the microgrid network further includes a local area network between the BITW security device and the local legacy device.

5. The system of claim 4, wherein the BITW security devices communicate with each other on the secured network that is separate from the local area network.

6. The system of claim 1, wherein the level of security on the secured network is more restrictive than at least one of the local area network and the network accessed by the remote network connection.

7. A system for legacy device securitization used with a microgrid, comprising, a first microgrid local network having at least two local devices, wherein at least one of the at least two local devices is a legacy device that cannot perform cryptographic operations, and at least one remote network connection to a non-local network control device, a first bump-in-the-wire (BITW) security device between one of the at least one local legacy devices and the at least one remote connection to the non-local network control device, wherein the first bump-in-the-wire (BITW) security device performs asymmetric and symmetric operations on data passed between the at least one local legacy device and the non-local network control device, wherein the first bump-in-the-wire (BITW) security device includes a first user interface to allow a user to access privileges to be given to the first bump-in-the-wire (BITW) security device, instructions to be sent to the first bump-in-the-wire (BITW) security device, and data available on the first bump-in-the-wire (BITW) security device to restrict access to the first microgrid local network, wherein the privileges to be given to the first bump-in-the-wire (BITW) security device include installing software and firmware on one or more devices of the first microgrid local network, wherein access attempts, successful logins, messages, or a combination thereof are logged into the first microgrid local network to enable auditing and forensic analysis, and wherein one or more authentication technologies are compared and selected for the first microgrid local network based on real time requirements of the first microgrid local network, and a second bump-in-the-wire (BITW) security device between the non-local network control device and the at least one remote network connection to the non-local network control device, wherein the second bump-in-the-wire (BITW) security device performs asymmetric and symmetric operations on data passed between the non-local network control device and the at least one remote connection, wherein the second bump-in-the-wire (BITW) security device includes a second user interface to allow the user to access privileges to be given to the second bump-in-the-wire (BITW) security device, instructions to be sent to the second bump-in-the-wire (BITW) security device, and data available on the second bump-in-the-wire (BITW) security device to restrict access to the first microgrid local network, and wherein the privileges to be given to the second bump-in-the-wire (BITW) security device include installing the software and the firmware on the one or more devices of the first microgrid local network, wherein the first and second bump-in-the-wire (BITW) security devices are positioned within the first microgrid local network to secure the at least one local legacy device, and wherein the bump-in-the-wire (BITW) security devices communicate with each other to cross check security settings and verify access requests on a secured network that is separate from the network accessed by the remote network connection.

8. The system of claim 7, wherein the system further includes, a second microgrid local network having at least two local devices and at least one remote network connection to the first microgrid network, and a bump-in-the-wire (BITW) security device between at least one of the local devices and the at least one remote connection of the second microgrid local network.

9. The system of claim 8, wherein the BITW security devices of the first and second microgrid local networks communicate with each other on the secured network that is separate from the first and second local microgrid networks.

10. The system of claim 9, wherein the BITW security devices communicate with each other on a secured network that is separate from the network accessed by the remote network connection.

11. The system of claim 10, wherein the communications on the secured network are used to grant access to a particular local device by another local device via the first microgrid local network or a remote device via the remote network connection.

12. The system of claim 11, wherein the communications on the first microgrid local network and via the remote connection are control and monitoring communications for controlling or monitoring a microgrid associated with the first microgrid local network.

13. A system for legacy device securitization used with a microgrid, comprising, a microgrid network having at least two local devices, wherein at least one of the at least two local devices is a legacy device that cannot perform cryptographic operations, and at least one remote network connection to a non-local network control device, a first bump-in-the-wire (BITW) security device between one of the at least one local legacy devices and the at least one remote connection to the non-local network control device, wherein the first bump-in-the-wire (BITW) security device performs asymmetric and symmetric operations on data passed between the at least two local legacy devices and the non-local network control device, wherein the first bump-in-the-wire (BITW) security device includes a first user interface to allow a user to access privileges to be given to the first bump-in-the-wire (BITW) security device, instructions to be sent to the first bump-in-the-wire (BITW) security device, and data available on the first bump-in-the-wire (BITW) security device to restrict access to the microgrid network, wherein the privileges to be given to the first bump-in-the-wire (BITW) security device include installing software and firmware on one or more devices of the microgrid network, wherein access attempts, successful logins, messages, or a combination thereof are logged into the microgrid network to enable auditing and forensic analysis, and wherein one or more authentication technologies are compared and selected for the microgrid network based on real time requirements of the microgrid network, and a second bump-in-the-wire (BITW) security device between the non-local network control device and the at least one remote network connection to the non-local network control device, wherein the second bump-in-the-wire (BITW) security device perform asymmetric and symmetric operations on data passed between the non-local network control device and the at least one remote connection, wherein the second bump-in-the-wire (BITW) security device includes a second user interface to allow the user to access privileges to be given to the second bump-in-the-wire (BITW) security device, instructions to be sent to the second bump-in-the-wire (BITW) security device, and data available on the second bump-in-the-wire (BITW) security device to restrict access to the microgrid network, and wherein the privileges to be given to the second bump-in-the-wire (BITW) security device include installing the software and the firmware on the one or more devices of the microgrid network, wherein the first and second bump-in-the-wire (BITW) security devices are positioned within the microgrid network to secure the at least two local legacy devices, and wherein the bump-in-the-wire (BITW) security devices communicate with each other to cross check security settings and verify access requests on a secured network that is separate from the network accessed by the remote network connection.

14. The system of claim 13, wherein the microgrid network includes a gateway device that provides the at least one remote connection.

15. The system of claim 14, wherein the microgrid network includes a firewall established between the gateway device and the BITW security device.

16. The system of claim 15, wherein the microgrid network further includes a local area network between the BITW security device and the local legacy device.

17. The system of claim 16, wherein the BITW security devices communicate with each other on the secured network that is separate from the local area network.

* * * * *